April 29, 1947.  C. L. MORRIS  2,419,849
NUT LOCK
Filed March 27, 1945

C. L. MORRIS
INVENTOR
BY *Gifford J. Holmes*
AGENT

Patented Apr. 29, 1947

2,419,849

UNITED STATES PATENT OFFICE 2,419,849

NUT LOCK

Charles L. Morris, Stratford, Conn., assignor to United Aircraft Corporation, East Hartford, Conn., a corporation of Delaware Application March 27, 1945, Serial No. 585,062

7 Claims. (Cl. 287—53)

The present invention relates to nut locks and more particularly to a device for locking in place the rotor structure of a helicopter, or the like.

An object of the present invention is to provide a novel nut lock cooperable with a nut wherein a substantially infinite number of locking positions is obtained, while permitting the nut to be adjusted precisely to the desired setting with substantially a zero tolerance.

Another object is to provide a novel keeper member for nut lock applications wherein the parts to be locked in place must not be marred or unduly stressed, such as in helicopter rotor heads for example.

The foregoing and other objects will be either obvious or pointed out in the following specification and claims.

Figure 1:
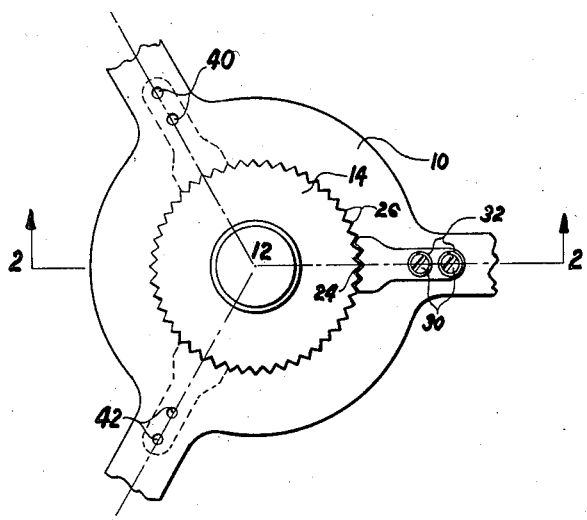
Fig. 1 is a plan view of a helicopter rotor head having nut lock in place.

In Fig. 1 a rotating member 10 is secured on a rotating shaft 12 by a nut 14 which screws down upon threads 16 of the shaft 12. The shaft 12 has a shoulder 18 upon which the member 10 may seat. The member 10 may be nonrotatively secured with relationship to the shaft 12 by splines 20 or by other means.

To prevent the nut 14 from becoming loosened upon the shaft, a keeper 22 is provided which has a knurled face 24 that cooperates with knurls 26 on the outside of the nut 14. The keeper 22 has holes 28 therein which may be slightly larger than the diameter of the lock bolts 30 which pass through the holes and screw down into the member 10 to afford a tolerance substantially less than the depth of the knurls. Lock washers 32 are provided for the bolts 30 to retain the bolts in place. The member 22 may be made of relatively soft material so that the lock washers 32 can bite into its surface to lock the bolts 30 into place.

To obtain a vernier type of setting for the keeper 22, the knurls 26 upon the nut 14 may be so pitched that corresponding parts of the different knurls do not lie 120° apart. If such is the case the member 10 may have holes 40 and 42 spaced in 120° relationship to the holes in which the bolts 30 are placed. Then if the keeper will not register its knurls with the knurls upon the nut in the position shown in Fig. 1, the keeper may be tried over similar pairs of holes 40 or 42 and the bolts 30 placed in position in whichever position the holes in the keeper 22 register best with the holes 40 or 42 to prevent unscrewing of the nut 14. This structure therefore provides for permitting the nut 14 to be turned down to a very precise setting and thereafter placement of the keeper 22 in position to best lock the nut 14 in place. This position is also one in which the maximum intermeshing of the knurls is obtained.

If the knurling upon the nut 14 has similar parts in 120° spaced relationship around the periphery of the nut 14, the holes 40 and 42 can be spaced so that they are not exactly 120° in axial relationship to the holes in which the bolts 30 are shown in Fig. 1. For example, the holes 40 can be 120° plus a part of a knurl away from the holes containing the bolts 30, and the holes 42 can be 120° minus a part of a knurl. Thus a tolerance is provided for the tightening of the nut 14 and the placement of the keeper 22.

Figure 3:
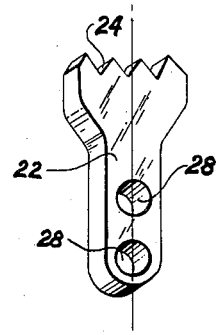
Fig. 3 is a perspective view of the keeper.
Figure 2:
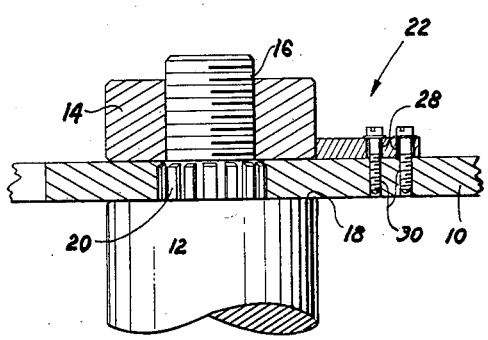
Fig. 2 is a section taken along the lines 2—2 of Fig. 1.

In Fig. 3 a keeper is shown which has the knurls thereof slightly offset from the center line passing through holes 28 and the inside apex of the center knurls. With such structure, when the keeper 22 is turned over, the knurls will be effectively shifted toward the right from the position shown in Fig. 3. Thus means is provided for further selecting the proper positioning of the keeper 22 with respect to the spaced holes in the member 10.

With the structure shown and described, I have provided a mechanism for permitting precise tightening of a nut in place and means having a vernier type of adjustment for the placement of the keeper. Obviously my other uses for the present device will be found by those skilled in the art. Therefore I wish not to be limited in my invention only to that form shown and described but by the scope of the following claims.

I claim:

1. In combination with a member secured upon a shaft by a nut, means for locking the nut upon the shaft comprising, a knurled surface upon the nut, a plurality of pairs of tapped holes in the member spaced equidistantly from the center of the nut, the angular spacing of said holes with respect to said knurls being such that the apex of one of the knurls will not have the same angular relationship with a common centerline of an adjacent pair of holes that the apex of another knurl has with a similar common centerline of another pair of holes, a knurled keeper having a pair of holes for registry with said tapped holes providing the degree of registry of the knurls of the keeper and of the nut is sufficient, the knurls of said keeper being arranged off center with respect to a common centerline of the holes therein to provide a different locking position dependent upon which side of said keeper is placed against said member, and lock bolts for placing in said holes to secure said keeper in place.

2. In combination with a member secured upon a shaft by a nut, means for locking the nut upon the shaft comprising, a knurled surface upon the nut, a plurality of tapped holes in the member spaced equidistantly from the center of the nut, the angular spacing of said holes with respect to said knurls being such that the apex of one of the knurls will not have the same angular relationship with an adjacent hole that the apex of another knurl has with another hole, a knurled keeper having a hole for registry with one of said tapped holes providing the degree of registry of the knurls of the keeper and of the nut is sufficient, the knurls of said keeper being arranged off center with respect to the hole therein to provide a different locking position dependent upon which side of said keeper is placed against said member, and a lock bolt for placing in one of said holes to secure said keeper in place.

3. In combination with a member secured upon a shaft by a nut, means for locking the nut upon the shaft comprising, a knurled surface upon the nut, a plurality of tapped holes in the member spaced equidistantly from the center of the nut, the angular spacing of said holes being such that the apex of one of the knurls will not have the same angular relationship with respect to an adjacent hole that the apex of another knurl has with another hole, a knurled keeper having a hole for registry with one of said tapped holes providing the degree of registry of the knurls of the keeper and of the nut is sufficient, and a lock bolt for placing in one of said holes to secure said keeper in place.

4. In combination, a rotatable shaft, a member mounted upon said shaft in nonrotatable relationship thereto, said member having tapped holes spaced unequally angularly but equidistantly radially about the center of said shaft, a threaded portion upon said shaft, a nut cooperable with said portion for securing said member in place, said nut having knurling on the outside thereof, a keeper having a hole for registry with one of said tapped holes and knurls for engaging said knurling to an extent predetermined by the pitch thereof and the angular spacing of said tapped holes with respect to the knurling of the nut, and a lock bolt for placing in one of said holes to secure said keeper in place.

5. In combination, a rotatable shaft, a member mounted upon said shaft in non-rotatable relationship thereto, said member having tapped holes spaced unequally angularly but equidistantly radially about the center of said shaft, a threaded portion upon said shaft, a nut cooperable with said portion for securing said member in place, said nut having knurling on the outside thereof, a knurled keeper for engaging said knurling to an extent predetermined by the pitch thereof and the angular spacing of said holes, the knurls of said keeper being arranged off center to provide additional operative positions for said keeper, and lock bolts for securing said keeper in place.

6. In combination, a rotatable shaft, a member mounted upon said shaft in nonrotatable relationship thereto, said member having fastening means spaced unequally angularly but equidistantly radially about the center of said shaft, a threaded portion upon said shaft, a nut cooperable with said portion for securing said member in place, said nut having knurling on the outside thereof, a keeper for engaging said knurling to an extent predetermined by the pitch thereof and the angular spacing of said fastening means, and means cooperable with said fastening means for securing said keeper in place.

7. In combination, a rotatable shaft, a member mounted upon said shaft in nonrotatable relationship thereto, a threaded portion upon said shaft, a nut cooperable with said portion for securing said member in place, said nut having knurling on the outside thereof, a selectively positioned keeper having knurls for registry with said knurling, and means for securing said keeper with respect to said shaft, said means being spaced around said shaft to afford a different degree of registry of the knurls and knurling depending upon the position of said keeper with respect to said shaft.

CHARLES L. MORRIS.

REFERENCES CITED

The following references are of record in the file of this patent:

UNITED STATES PATENTS

| Number | Name | Date |
| --- | --- | --- |
| 1,418,050 | Bable | May 30, 1922 |
| 1,352,643 | Young | Sept. 14, 1920 |
| 2,077,620 | Dicke | Apr. 20, 1937 |